Aug. 31, 1965   C. O. B. MORGAN   3,203,443
VALVE WITH SUPPLEMENTAL REPAIR CHECK VALVE
Filed March 26, 1963
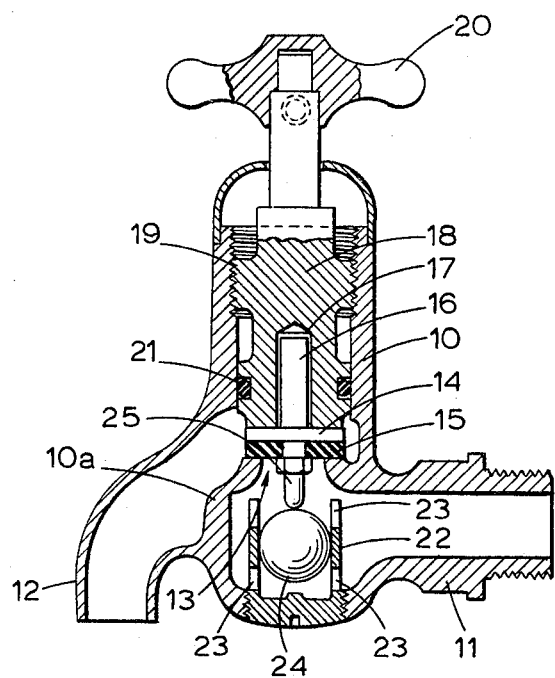

United States Patent Office 3,203,443
Patented Aug. 31, 1965

3,203,443
VALVE WITH SUPPLEMENTAL REPAIR CHECK VALVE
Cyril Oscar Beadon Morgan, London, England, assignor, by mesne assignments, to Love, Marden and Wilson Limited, London, England
Filed Mar. 26, 1963, Ser. No. 268,057
Claims priority, application Great Britain, Mar. 30, 1962, 12,415/62
2 Claims. (Cl. 137—329.3)

This invention is concerned with taps or valves and more particularly although not necessarily exclusively with taps or valves to be employed in domestic water systems.

According to the invention there is provided a tap or valve comprising a casing with an inlet and an outlet; a partition within the casing, the said partition having an orifice through which liquid can flow from the inlet to the outlet; an element movable on the outlet side of the orifice between a position in which it closes the orifice and a position in which it is displaced from the orifice to permit liquid to flow from the inlet to the outlet; a rotatable plug or spindle member controlling the position of the movable element with respect to the orifice, the said plug or spindle member and the said movable element being capable of being withdrawn from the casing; a closure element on the inlet side of the orifice capable, when the movable element is withdrawn from the casing, of movement under the pressure of liquid at the inlet to a position in which the orifice is closed; and guide means within which the closure element is movable.

In order that the nature of the invention may be more readily understood reference will now be made to the drawing which shows a sectional view of a tap according to the invention.

The tap illustrated in the drawing comprises a body or casing 10 which is provided with an inlet connection 11 and an outlet or discharge spout 12. The body or casing 10 is formed internally with a partition 10a having an orifice 13 through which liquid can flow from the inlet connection 11 to the outlet or discharge spout 12. Co-operating with a seating at the top or outlet side of the orifice 13 is a jumper element 14 which is adapted to carry a replaceable sealing washer 15. This jumper element has a shank portion 16 adapted to be accommodated in an axial bore or recess 17 in the lower part of a plug or spindle member 18. This spindle member 18 has a screw-threaded portion 19 adapted to co-operate with a correspondingly screw-threaded portion in the body or casing 10 so that rotation of a handle 20 will cause the member 18 to be moved towards or away from the orifice 13 thereby either to urge the washer 15 of the jumper element 14 into contact with the seating around the top of the orifice 13 or to allow it to be displaced from the orifice under the pressure of water from the inlet 11. In the drawing the jumper element 14 is shown on its seating, i.e., in the closed position. An O-type sealing ring 21 is located in an annular recess in the plug or spindle member 18 to prevent leakage of liquid along the member 18 when the tap is open.

A cup-like guide element 22 is screw-threaded or otherwise fixed in the lower part of the tap body or casing 10. The walls of the element 22 are perforated as indicated at 23. The element 22 is adapted to retain and guide a ball closure element 24 which is in turn adapted, as hereinafter described, to close the lower or inlet side of the orifice 13. The jumper element 14 has an extension 25 which serves normally to hold the ball 24 away from the seating at the underside of the orifice. The ball 24, and if desired the cup like element 22, is preferably made of plastic material such as polyethylene.

When the tap is closed, the washer 15 of the jumper element 14 is pressed against the seating at the top of the orifice 13 so that liquid flow will be cut off. At the same time, the extension 25 on the jumper element 14 holds the ball 24 away from the seating at the underside of the orifice 13. If the plug or spindle member 18 is rotated to open the tap the jumper element 14 will rise from its seating under the pressure of liquid in the inlet connection 11 and liquid will flow through the orifice 13 to the outlet or discharge spout 12. If the tap opened to a normal extent the extension 25 on the jumper element 14 will prevent the ball 24 from contacting the seating at the lower side of the orifice 13.

If the washer 15 becomes worn and requires replacement, it is possible to rotate the plug or spindle member 18 beyond the normal open position of the tap so as completely to unscrew and withdraw the member 18 from the casing or body 10 whereupon the jumper element 14 may also be removed to allow of replacement of the washer. At a point in the withdrawal of the plug or spindle member 18 from the casing, the extension 25 on the jumper element 14 will no longer be effective to hold the ball 24 away from the seating at the underside of the orifice 13 and the ball will, due to the pressure of liquid in the inlet connection 11, be forced into engagement with the seating thereby to close the orifice and effectively to shut off the liquid flow. The perforated cup-like element 22 serves to ensure that the ball 24 is guided to seat properly on the orifice.

It will be appreciated from the foregoing that in the event of a washer requiring changing that it may be readily effected without the necessity for the employment of any tools on the tap and without any possibility of undesired leakage while the repair is being made.

If desired, the sealing washer 15 can be carried by an element fixed to or integral with the spindle member 18 instead of being carried by a jumper element.

What I claim is:

1. A valve comprising a casing having an inlet and an outlet, a partition within said casing, an orifice in said partition for the passage of liquid from said inlet to said outlet, a rotatable spindle member in screw-threaded engagement with said casing, a jumper element on said spindle and movable therewith between a lower position against and closing said orifice and an upper position displaced from said orifice to permit liquid flow therethrough, an extension on said jumper element and movable therewith passing through said orifice, an open-topped cylindrical cup located below and coaxial with the inlet side of said orifice, said cup having an aperture adjacent the bottom of the peripheral wall thereof in constant communication with said inlet, a buoyant ball of diameter less than the height of the cup but substantially equal to the diameter of the cup and adapted to close said orifice when said ball is in the upper portion of the cup, the extension normally engaging said ball to displace it from the upper portion of the cup, upward movement of the spindle, jumper element and extension permitting liquid to enter the cup below the center of the ball to urge positive upward movement of said ball toward and into engagement with said orifice to close same.

2. The device of claim 1 wherein said ball is formed of polyethylene.

References Cited by the Examiner

UNITED STATES PATENTS

| 988,575 | 4/11 | Joyce | 137—329.3 |
| 1,564,280 | 12/25 | Schmidt | 137—329.3 |
| 2,381,917 | 8/45 | Lornitzo | 251—360 XR |
| 2,657,006 | 10/53 | Drow | 251—218 |
| 2,661,019 | 12/53 | Snyder | 251—368 XR |

FOREIGN PATENTS 2,699 1898 Great Britain.

ISADOR WEIL, *Primary Examiner.*